United States Patent [19]

Matsumoto et al.

[11] 4,306,533

[45] Dec. 22, 1981

[54] INTERNAL COMBUSTION ENGINE WITH EXHAUST GAS RECYCLING SYSTEM

[75] Inventors: Hiromitsu Matsumoto, Hamamatsu; Keiichi Sugiyama, Shizuoka, both of Japan

[73] Assignee: Yamaha Hatsudoki Kabushiki Kaisha, Iwata, Japan

[21] Appl. No.: 88,466

[22] Filed: Oct. 26, 1979

[30] Foreign Application Priority Data

Oct. 26, 1978 [JP] Japan ............................ 53-132002

[51] Int. Cl.³ ........................................... F07M 25/06
[52] U.S. Cl. ..................................... 123/571; 123/568
[58] Field of Search ............................ 123/568, 571

[56] References Cited

U.S. PATENT DOCUMENTS 4,194,474 3/1980 Endo .................................. 123/571

FOREIGN PATENT DOCUMENTS 2453160 5/1975 Fed. Rep. of Germany ...... 123/571

Primary Examiner—Wendell E. Burns
Attorney, Agent, or Firm—Ernest A. Beutler

[57] ABSTRACT

An internal combustion engine and method of operating it that improves combustion efficiency, fuel economy and exhaust emission during low speed running. The engine is equipped with a relatively conventional main induction system and an auxiliary induction system having a substantially smaller cross sectional area for delivering a charge to the chambers of the engine at a high velocity to improve turbulence and combustion efficiency. A control valve arrangement is incorporated so that the idle and low speed requirements are supplied through the auxiliary induction system and the medium and higher load charge requirements are supplied primarily through the main induction system. An exhaust gas recirculating system is incorporated for reintroducing exhaust gases to the combustion chamber so as to reduce the emissions of nitrous oxide. A control arrangement is incorporated so that the exhaust gases are recirculated only at the time when the auxiliary induction system is supplying the primary portion of the charge requirements. A fuel enrichment system is also incorporated for providing a richer than normal fuel air-mixture at such time as exhaust gases are being recirculated. An arrangement is also incorporated for advancing the spark ignition at the time the exhaust gases are being recirculated and when the main induction system begins to supply a large portion of the engine charge requirements.

12 Claims, 3 Drawing Figures

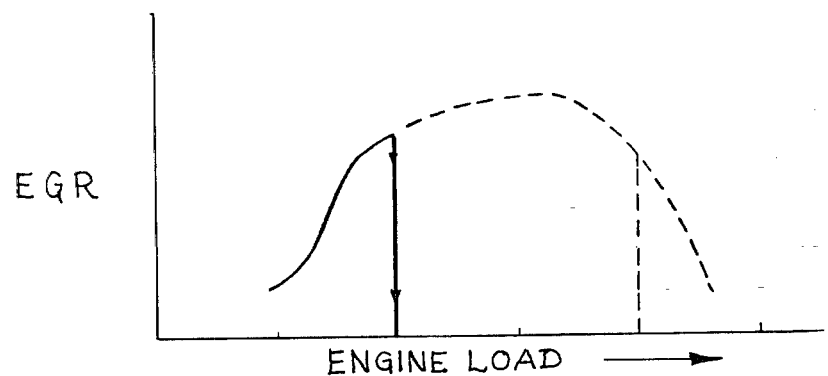
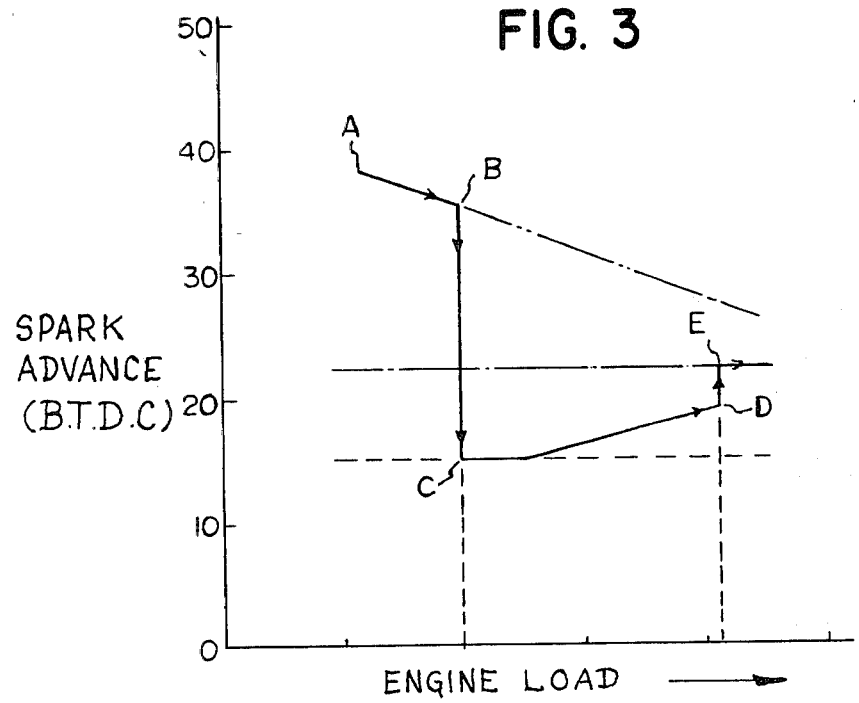

INTERNAL COMBUSTION ENGINE WITH EXHAUST GAS RECYCLING SYSTEM

BACKGROUND OF THE INVENTION

This invention relates to an internal combustion engine incorporating exhaust gas recirculation and more particularly to an improvement in such an engine and in the method of operating it.

Recently, it has been proposed to improve the combustion efficiency, fuel economy, exhaust emission control and engine running at idle and low loads by introducing a substantial proportion of the intake charge under these running conditions through a relatively small cross sectional area auxiliary induction system. As a result, the induced charge enters the chambers at a high velocity to generate turbulence which improves flame propagation and the aforenoted engine running characteristics. It has also been known that the emission of nitrous oxide in the engine exhaust gases may be effectively controlled through the use of an exhaust gas recirculation (EGR) system. Most conventional engines are extremely sensitive to the amount of exhaust gas recirculation and poor running characteristics, particularly at low speeds are encountered with conventional engines using exhaust gas recirculation. It has been found that the use of the auxiliary induction system affords a greater EGR tolerance and furthermore simplifies the spark timing of an engine due to the offsetting acceleration of flame propagation by the use of the auxiliary induction system and the retardation of the rate of flame propagation through the use of exhaust gas recirculation. A problem exists, however, in accurately controlling the spark timing, exhaust gas recirculation control and the control of the proportion of the charge entering the chambers through the main and auxiliary induction systems.

It is, therefore, a principal object of this invention so as to provide an improved internal combustion engine and method of operating it that controls exhaust gas emissions, simplifies spark timing and provides good running characteristics and efficiency.

In accordance with the features aforedescribed, it has further been discovered that the aforenoted running conditions can be significantly improved by providing an enrichened fuel-air mixture during the time when exhaust gas recirculation is being accomplished. It is, therefore, a still further object of this invention to provide an improved system and method by which this may be accomplished.

SUMMARY OF THE INVENTION

A first feature of the invention is adapted to be embodied in an internal combustion engine having a chamber of variable volume in which combustion occurs and main and auxiliary induction passages for delivering a a charge to the chamber. The auxiliary induction passage has a substantially lesser effective cross sectional area than the main induction passage so that a charge will be delivered to the chamber at a greater velocity through the auxiliary induction than and through the main induction passage. Control valve means control the proportion of the charge delivered to the chamber through the respective induction passages. Exhaust gas recirculating means and exhaust gas recirculating control means are provided for recirculating a controlled amount of exhaust gas back to the chamber. Means are provided for delivering an enriched fuel-air mixture to the chamber during such time as exhaust gases are being recirculated.

Another feature of this invention is adapted to be embodied in a method of operating an engine having a chamber, main and auxiliary induction passages as set forth in the preceding paragraph. In accordance with this feature of the invention, the engine is operated by recirculating exhaust gases to the chamber during certain running conditions and providing an enriched fuel air mixture for the chamber at such time as the exhaust gases are being recirculated.

Another feature of this invention is adapted to be embodied in an engine having a chamber, main and auxiliary induction passages, and control valve means as set forth in the preceding two paragraphs. In accordance with this feature of the invention, the engine is also provided with a spark timing device and means for advancing the spark timing from normal only during such time as the exhaust gases are being recirculated.

Yet another feature of this invention is adapted to be embodied in a method of operating an engine constructed in accordance with that described in the immediately described paragraph. In accordance with this feature of the invention, the engine is operated by advancing the spark timing from normal during such time as exhaust gases are being recirculated and by immediately retarding the spark upon the cessation of exhaust gas recirculation.

BRIEF DESCRIPTION OF THE DRAWINGS

FIG. 2 is a graphical analysis of the exhaust gas recirculation in relation to engine load curve of the engine shown in FIG. 1.

FIG. 3 is a graphical analysis of the spark timing in relation to engine load of the engine shown in FIG. 1.

DETAILED DESCRIPTION OF THE PREFERRED EMBODIMENT

Figure 1:
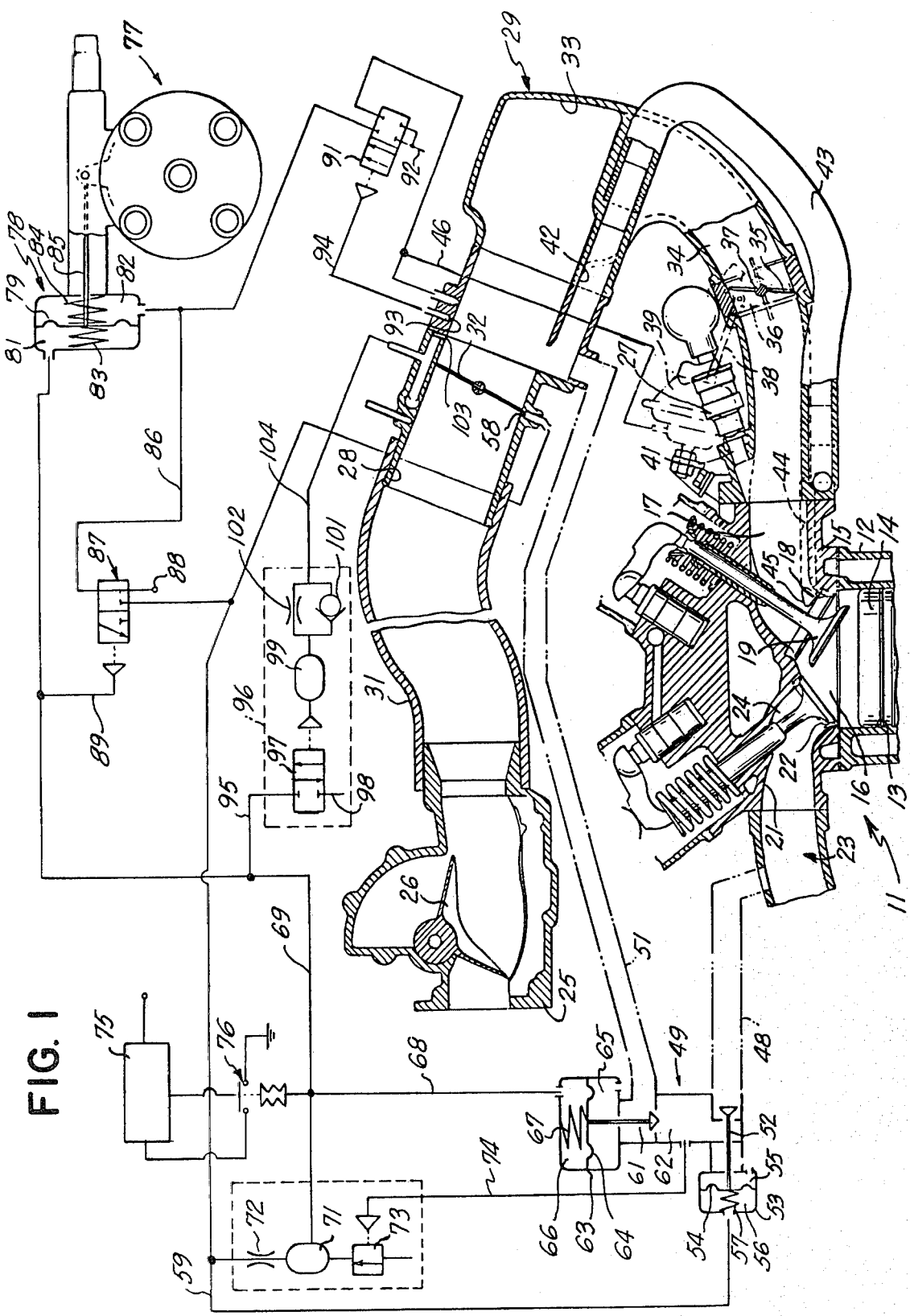
FIG. 1 is a partially schematic cross sectional view taken through a portion of a single cylinder of a multi cylinder combustion engine embodying this invention.

In FIG. 1 a portion of an internal combustion engine constructed and operated in accordance with the features of this invention is identified generally by the reference numeral 11. The engine 11 consists of a cylinder block 12 having a plurality of cylinder bores 13 in which pistons 14 are supported for reciprocation. The construction associated with only a single of the cylinder bores 13 has been illustrated since it is believed that the principles of the invention may be readily apparent and that those skilled in the art will readily perceive how this invention is applied to the remaining cylinders.

A cylinder head 15 is affixed to the cylinder block 12 in any known manner and has a number of cavities 16 each of which cooperates with a respective one of the cylinder bores 13 and pistons 14 so as to provide a chamber of variable volume in which combustion occurs. The cavities 16 will at times be referred to as the combustion chamber and this term is intended to include the afore defined variable volume chamber. Main cylinder head intake passages 17 are formed in one side of the cylinder head 15 and terminate in main intake ports 18. An intake valve 19, which is operated in any known manner, controls the communication of the main induction passages 17 with the chambers 16.

Exhaust passages 21 are formed in the opposite side of the cylinder head 15 and extend from exhaust ports 22 in communication with the chambers 16 to an exhaust manifold, indicated generally at 23. Exhaust valves 24, which are also operated in any known manner, control the communication of the chambers 16 with the exhaust passages 21.

The engine 11 is also provided with an induction system which includes an air inlet 25 in which a vane type air flow detector 26 is provided. The detector 26 senses the air flow through the inlet 25 and provides a control in a manner to be described, for the amount of fuel discharged by fuel injection nozzles 27 which serve each of the chambers 16 in a manner to be described.

The air inlet 25 supplies the intake air to an inlet 28 of an intake manifold, indicated generally by the reference numeral 29 by means of a flexible conduit 31. A manually operated throttle valve 32 is provided in the inlet 28 for controlling the total mass flow to the chambers 16 in a known manner. Downstream of the throttle valve 32, the manifold 29 is provided with a plenum 33 from which individual runners 34 extend to serve each of the cylinder head main induction passages 17.

Automatically controlled throttle valves 35 are provided in each of the runners 34 so as to control the amount of charge delivered to the chamber 16 through the main intake system consisting of the runners 34, main induction passages 17 and intake ports 18. The control valve 35 is operated by means of a lever 36 that is affixed to a shaft 37 which rotatably supports each of the control valves 35. An actuating rod 38 of a vacuum actuator 39 is connected to the lever 36 for rotating the control valves 35. The vacuum actuator 39 is suitably supported on the manifold 29 by means of a bracket 41. As will become apparent, the vacuum actuator 39 is constructed so that the control valves 35 will be held in a closed position until a predetermined time.

An auxiliary induction system is also incorporated for delivering the main portion of the charge to the chambers 16 during idle and low speed operation. The auxiliary induction system includes an inlet 42 that is in communication with the main intake inlet 28 just downstream of the throttle valve 32. Auxiliary runners 43 extend from the inlet 42 to auxiliary induction passages 44 formed in the cylinder head 15 adjacent the main induction passages 17. The auxiliary induction passages 44 terminate in auxiliary intake ports 45 which are juxtaposed to the main intake ports 18 for discharge into the chambers 16 through the open intake valves 19. The effective cross sectional area of the auxiliary induction system consisting of the runners 43, auxiliary induction passages 44 and auxiliary intake ports 45, is substantially less than that of the main induction system so that a given mass flow of charge entering the chambers through the auxiliary induction system will be flowing at a significantly greater velocity. It should be noted that when the control valves 35 are closed, the intake flow is shunted to the chamber 16 through the described auxiliary induction system. The vacuum signal for the actuator 39 is provided by means of a conduit, indicated schematically at 46 which communicates the actuator 39 with a vacuum port 47 formed in the manifold 29 immediately downstream of the closed position of the throttle valve 32.

The engine 11 includes an exhaust gas recirculation (EGR) system for recirculating a portion of the exhaust gases from the chamber 16 back to the chamber 16 under certain running conditions. The exhaust gas recirculating system includes a first passage 48 that extends from the exhaust manifold 29 to an EGR valve, indicated generally by the reference numeral 49, which is of the well known back pressure type. The exhaust gases are delivered from the EGR valve 49 to a conduit 51 which communicates with the intake manifold 29 immediately upstream of the auxiliary induction system inlet 42. Recirculated exhaust gases will, therefore, be drawn back into the induction system for introduction to the chambers 16 at a high velocity primarily through the auxiliary induction system.

The EGR valve 49 includes a first valve element 52 that is actuated by a vacuum actuator 53 having a diaphragm 54 that divides the actuator 53 into an atmospheric chamber 55 and a vacuum chamber 56. A spring 47 is provided in the vacuum chamber 56 for normally biasing the first valve section 52 to its open position. The vacuum chamber 56 receives its actuating pressure from a port 58 formed in the intake manifold 29 adjacent the upstream idle position of the throttle valve 32. A conduit 59 communicates the port 58 with the vacuum chamber 56. In the idle position the port 58 is exposed to atmospheric pressure and such pressure acting through the conduit 59 into the chamber 56 causes the pressure in the chambers 56 and 55 to be substantially equal and the spring 57 will urge the valve element 52 to its opened position. When the intake vacuum in the port 58 is low, such as when the throttle valve 32 is only slightly opened, the port 58 will sense a low negative pressure which will tend to close the valve element 52.

The EGR valve 49 includes a second valve element 61 that controls the communication between a pressure chamber 62 upstream of the first valve element 52 and the conduit 51. Accordingly, exhaust gases will not be recirculated unless both of the valve elements 52 and 61 are opened.

The valve element 62 is controlled by an actuator 63 that includes a diaphragm 64 which divides the actuator 63 into an atmospheric chamber 65 and a vacuum chamber 66. A spring 67 is provided in the vacuum chamber 66 for normally urging the valve element 61 to its closed position. The vacuum chamber 66 is provided with its signal by means of a conduit 68 that communicates with a conduit 69.

The conduit 69 in turn communicates with a vacuum tank or vacuum accumulator 71. The tank 71 is evacuated via the conduit 59 through a restriction or orifice 72. The tank 71 is also vented to the atmosphere via a variable orifice valve 73 that is controlled by the pressure in the EGR valve chamber 72 through a conduit indicated schematically at 74. The degree of restriction of the atmospheric vent 73 is increased as the pressure in the chamber 62 is increased so as to reduce the amount of venting of the tank 71.

The operation and effect of the EGR valve 49 may be best understood by reference to FIG. 2. This figure indicates the amount of exhaust gas recirculation on the absyssa in relation to engine load, which is represented on the ordinate. When the engine 11 is idling the port 58 will be exposed to atmospheric pressure and the chambers 55, 56 of the actuator 53 and the chambers 65, 66 of the actuator 63 will be at substantially the same atmospheric pressure. The spring 57 will then open the valve element 52 and the spring 67 will close the valve element 61. Hence there is no exhaust gas recirculation at idling.

As the throttle valve 32 is opened and the engine load increases at immediately offidle, the port 58 will be exposed to a reduced pressure which is transmitted through the conduit 59 to the chamber 56. At the same time, the pressure in the accumulator 71 will begin to decrease and a negative pressure will be exerted in the actuator chamber 66 so as to cause the valve element 61 to open. At this stage, the negative pressure in the chamber 56 is not sufficient to overcome the action of the spring 57 so that the valve element 52 will still be held open. Thus, exhaust gas recirculation begins and follows the solid line curve shown in FIG. 2.

As has been previously noted, the detector vane 26 controls the amount of fuel discharge from the nozzles 27 in relation to air flow. The structure for doing this is believed to be well known and, for that reason, has not been described. Generally such structure includes an electrical control circuit which is responsive to the angular position of the vane 26. In accordance with this invention, this circuit includes a fuel enrichment device indicated schedmatically at 75 which forms a part of the complete fuel control system. The device 75 is switched, by means of a pressure operative switch indicated schematically at 76 between a condition in which a relatively rich fuel air mixture is supplied and a condition in which a normal, relatively lean fuel air mixture is supplied. The switch 76 is responsive to the pressure in the accumulator tank 71 and when the vacuum in the tank 71 is high (low absolute pressure) the richer mixture will be supplied. On the other hand when the vacuum in the tank 71 is reduced (absolute pressure high) the switch 76 operates to provide a relatively lean, normal mixture.

Spark plugs (not shown) are provided for firing the charge in each of the chambers 16. The spark plugs are provided with a high voltage to generate a spark at a timed interval by a distributor mechanism indicated generally by the reference numeral 77. The distributor 77 includes a governor mechanism (not shown) of known type which advances the spark timing as the speed of the engine 11 increases. Also, a pressure indicated generally by the reference numeral 78 is provided for altering the spark timing in response to conditions now to be noted. The pressure control device 78 includes a housing that is divided by means of a diaphragm 79 into chambers 81 and 82. Springs 83 and 84 are provided in the chambers 81 and 82, respectively. The diaphragm 79 is connected by means of a link 85 to the distributor plate so as to retard the spark timing at the rod 85 for pull to the left as shown in FIG. 1 and to advance the timing when the rod 85 is moved to the right as shown in this figure. The pressure controlled timing provided by the device 78 is superimposed upon the timing afforded by the governor mechanism of the distributor 77 in a known manner.

The first chamber 81 of the device 78 is in communication with the pressure of the vacuum tank 71 via the conduit 69. The chamber 82, on the other hand, is in selective communication with the conduit 59 and accordingly the port 58 by means of a conduit indicated schematically by the reference numeral 86 and by means of a valve indicated generally by the reference numeral 87. The valve 87 communicates the chamber 36 with the conduit 59 when in a first position and vents the chamber 82 to the atmosphere through an atmospheric vent 88 when in a second position, which position is shown in FIG. 1. The valve 87 is responsive to the pressure in the tank 71 via the conduit 69 and a conduit 89. The valve 87 is normally held in the position shown in FIG. 1 and is moved to the position wherein the chamber 82 is exposed to the pressure in the conduit 59 when the vacuum in the tank 71 exceeds a predetermined level (absolute pressure falls to a predetermined value).

The chamber 82 and the actuator 39 are also selectively dumped to atmosphere pressure by means of a valve 91 which is interposed in the conduit 46 and the conduit 86. The valve 91 is normally held in a closed position as shown in FIG. 1 and is movable to a position wherein an atmospheric vent 92 is opened in response to the existence of a predetermined negative pressure in the induction system downstream of the throttle valve sensed at a port 93. The port 93 is connected to the valve 91 by means of a conduit schematically indicated at 94. As has been noted, when the pressure at the port 93 falls to a preset value (manifold vacuum increases to a preset value) the valve 91 is actuated so as to vent the line 46 and the chamber 82 to atmospheric pressure through the atmospheric port 92.

The vacuum tank 71 is also dumped selectively to the atmosphere by means of a conduit 95 and time delay valve indicated generally by the reference numeral 96. The time delay valve 96 includes a spool 97 that is movable between a closed position as shown in this figure and a position wherein the line 95 is communicated with an atmospheric port, indicated schematically at 98. The valve spool 97 is operated in response to the pressure existing in a vacuum tank 99 which is charged by means of a one way delay circuit including a check valve 101 and a restricted orifice 102, which are in parallel circuit with each other and which are in communication with a vacuum port 103 positioned downstream of the throttle valve 32 by means of a conduit, indicated schematically at 104.

The arrangement of the time delay valve 96 is such that when the pressure in the tank 99 falls below a predetermined value, the valve spool 97 is moved from the position wherein the conduit 95 is blocked from communication with the atmospheric port 98 to a position wherein the communication is opened and the tank 71 will be dumped to atmosphere. The operation is such that when the throttle valve 32 is closed and the engine is in its idling condition, the tank 99 will be rapidly evacuated through opening of the check valve 101 and the valve spool 97 will be moved to its closed position. When the throttle valve 32 is opened, the pressure at the port 103 will increase and the pressure in the tank 99 will build up slowly due to the restricted orifice 102. When the pressure reaches a predetermined value, at a time delay afforded by the orifice 102, the valve spool 97 will be actuated so as to dump the tank 71 into the atmosphere.

OPERATION

At idle the throttle valve 32 will be substantially closed and the port 58 positioned so that it senses atmospheric pressure. Thus, atmospheric pressure will be present in the line 59 and the tank 71 will be at atmospheric pressure. Thus, atmospheric pressure exists in the chamber 66 of the EGR valve actuator 63 and the valve element 61 will be closed so that there is no exhaust gas recirculation. At the same time, the atmospheric pressure will be sensed by the device 76 so that the device 75 in the fuel control circuit will provide the lean or normal fuel air ratio to the injectors 27. The valve 91 will be closed and the relatively low induction system pressure sensed at the port 47 will be transmitted to the actuator 39 so as to hold the control valve 35 in its closed position. Thus, all of the intake air for the chamber 16 will be delivered at a high velocity through the auxiliary induction system including the passages 43, 44 and port 45. The fuel charge will, of course, be drawn in from the main induction passage when discharged from the nozzle 27. Because of the high velocity, combustion efficiency is improved due to the fast flame propagation.

Since the tank 71 is at atmospheric pressure, atmospheric pressure will exist in the chamber 81 of the vacuum actuator 78 of the distributor 77. At the same time, the valve spool 87 will be in a position so that the chamber 82 exposed to the same pressure through conduit 59. Thus, the spark timing for the distributor 77 will be set by governor only.

As the load on the engine increases and the throttle valve 32 is manually opened, the port 58 will now be positioned on the downstream side of the throttle valve 32 and a reduced pressure will be experienced at this port and through the conduit 59. At the same time, the pressure in the tank 71 will be charged down (tank 71 will be evacuated) through the restriction 72. The reduced pressure will, of course, build up at a rate determined by the restriction of the orifice 72 and that of the adjustable vent 73 which is dependent upon the pressure in the EGR chamber 62.

The negative pressure existing in the chamber 66 of the EGR actuator 63 will cause the valve element 61 to begin to open and exhaust gas recirculation will follow the curve shown in FIG. 2. At this time, the negative pressure in the chamber 56 is not sufficient so as to cause the valve element 52 to close fully. When the engine speed and load increases the exhaust pressure in the chamber 62 will increase to further increase the restriction offered by the adjustable orifice 73 so that the EGR curve follows that in FIG. 2. When exhaust gas recirculation is commenced by opening of the valve element 61, the pressure responsive member 76 will also be actuated so as to shift the device 75 of the fuel control to its rich setting. Thus, when exhaust gas recirculation is begun, the fuel injection nozzles 27 will deliver a richer mixture than they were previously to that time.

Pressure in the tank 71 is transmitted to the chamber 81 of the actuator 78 of the distributor 77. This pressure also is transmitted through the conduit 89 so as to actuate the valve spool 87 so that the line 86 and chamber 82 will be vented to the atmosphere through the port 88. Thus, the rod 85 will be shifted to the left and spark timing will be advanced so as to compensate for the reduction of burning rate due to the exhaust gas recirculation. During this phase of the operation, the spark advance will follow the portion of the solid line curve AB in FIG. 3.

Previous to opening of the throttle valve 32, a negative pressure was exerted through the port 103, conduit 104 and open check valve 101 so as to reduce the pressure in the tank 99 and cause the valve spool 97 to be held so that the conduit 95 was closed from its atmospheric venting with the port 98. However, as the throttle valve 32 is opened as increase in pressure will be exerted at the port 103 which will cause air gradually to enter the tank 99 through the orifice 102 to cause the time delay of the shifting of the spool 97 to its venting position. After this time delay has occurred, the valve spool 97 will be shifted to the left as seen in FIG. 1 and the line 69 and accordingly tank 71 will be dumped to the atmosphere through the port 98. Upon this dumping, atmospheric pressure will be exerted in the chamber 66 of the EGR valve actuator 63 and this pressure and the spring 67 will cause the valve element 61 to close and cut off exhaust gas recirculation. Thus, it should be clear that exhaust gas recirculation is continued for a predetermined time lag after the throttle valve 32 is opened and the engine is accelerating. After that delay exhaust gas recycling is stopped.

At the same time that the tank 71 is dumped, the valve 87 will be shifted to the right so that the chamber 82 of the vacuum actuator 78 will communicate with the line 59. The chamber 81 of this actuator is exposed to the same pressure so that the rod 85 of this actuator will be shifted to the right and ignition timing will be retarded alone the line BC of FIG. 3 to that normally set by the governor of the distributor 77.

Simultaneously with retardation of the spark timing and discontinuance of exhaust gas recirculation, the pressure responsive element 76 will be shifted so that the fuel control device 75 will again be returned to its normal lean condition.

As the throttle valve 32 continues to open, the pressure at that port 92 will decrease until such a point that the valve spool 91 is shifted to the right to vent the conduit 46 to atmosphere. At this time, the actuator 39 will be vented to atmosphere and the control valve 36 will open so that a substantial portion of the charge to the chamber 16 will be supplied through the main induction system rather than through the auxiliary induction system. Because of this, there will be no decrease of volumetric efficiency and maximum power output of the engine is not sacrificed.

Upon opening of the control valves 35 by the shifting of the valve spool 91, the conduit 86 and chamber 82 of the actuator 78 of the distributor 77 will also be vented to atmospheric pressure. Thus, both chambers 81 and 82 of this actuator will be at the same pressure and pressure operated advance mechanism 78 is effectively disabled so that ignition timing is advanced along the curve D-E to compensate for the decreased amount of turbulence in the chamber 16 and accordingly the retarded rate of combustion.

It should be readily apparent from the foregoing description that the disclosed system provides for an automatic spark advance during the conditions of exhaust gas recirculation so as to accommodate the retarded rate of combustion. Furthermore, a richer than normal fuel air mixture is provided under these running conditions and these situations will return to normal immediately upon discontinuance of the exhaust gas recirculation. Various changes and modifications may be made from the invention as described without departing from the spirit and scope of the invention, as set forth in the appended claims.

What is claimed is:

1. In an internal combustion engine having a chamber of variable volume in which combustion occurs, a main induction passage for supplying a charge to said chamber, an auxiliary induction passage having a significantly lesser effective cross sectional area than said main induction passage for delivering a charge to the chamber at a significantly greater velocity than the main induction passage, control valve means for controlling the proportion of the charge delivered to the chamber through the respective induction passages, exhaust gas recirculating means for recirculating a portion of the exhaust gases from the chamber back to the chamber, and exhaust gas recirculation control valve means for controlling the amount of exhaust gases recirculated to said chamber, the improvement comprising means for providing an enriched fuel-air mixture to the chamber only during such times as exhaust gases are being recirculated.

2. An internal combustion engine as in claim 1 wherein the exhaust gas recirculating means is responsive to the control valve means for effecting exhausting gas circulation only when the major portion of the charge is delivered to the chamber through the auxiliary induction system.

3. An internal combustion engine as in claim 1 further including a fuel injection nozzel for discharging fuel into at least one of the induction passages, the means for providing the enriched fuel air mixture being effective to provide additional fuel discharge from said fuel injection nozzle.

4. An internal combustion engine as in claim 3 further including an air flow detector for controlling the amount of fuel discharged by the fuel injection nozzle.

5. An internal combustion engine as in claim 4 wherein the auxiliary induction passage has its inlet in communication with the main induction passage, the air flow detector being positioned in the main induction passage upstream of said auxiliary induction passage inlet.

6. An internal combustion engine as in claim 1 wherein the exhaust gas recirculation control valve means and the means for providing the enriched fuel air mixture each include pressure responsive means, said pressure responsive means being subjected to the same pressure.

7. An internal combustion engine as in claim 6 wherein the pressure exerted on the pressure responsive means is induction system pressure, the control valve means including a manually operated throttle valve positioned in one of the induction passages, the pressure being sensed contiguous to the manually positioned throttle valve and being upstream thereof when said throttle valve is in its ideal position and downstream of said throttle valve when said throttle valve is in its off idle position.

8. The method of operating an internal combustion engine having a chamber of variable volume in which combustion occurs, a main induction passage for supplying a charge to said chamber, an auxiliary induction passage having a significantly lesser effective cross sectional area than the main induction passage for delivering a charge to the chamber at a significantly greater velocity than the main induction passage, control valve means for controlling the proportion of the charge delivered to the chamber through the respective induction passages, exhaust gas recirculating means for recirculating a portion of the exhaust gases from the chamber back to the chamber, comprising the steps of controlling the amount of exhaust gases recirculated to said chamber and providing an enriched fuel-air mixture to the chamber only during such times as exhaust gases are being recirculated.

9. The method of claim 8 wherein the exhaust gas is recirculated only when the major portion of the charge is delivered to the chamber through the auxiliary induction system.

10. The method of claim 8 further including the step of discharging fuel into at least one of the induction passages from a fuel injection nozzle, the enriched fuel air mixture being accomplished by providing additional fuel discharge from said fuel injection nozzle.

11. The method of claim 10 including the step of controlling the amount of fuel discharged by the fuel injection nozzle by sensing air flow.

12. The method of claim 11 wherein the auxiliary induction passage has its inlet in communication with the main induction passage, the air flow being detected in the main induction passage upstream of said auxiliary induction passage inlet.

* * * * *